United States Patent [19]
Aslami et al.

[11] Patent Number: 5,369,518
[45] Date of Patent: Nov. 29, 1994

[54] OPTICAL COMMUNICATION SYSTEM AND METHOD ELECTRICAL POWER TRANSMISSION FOR THEREOF

[75] Inventors: Mohd Aslami, Sturbridge; Ronald L. Lavallee, Southbridge, both of Mass.

[73] Assignee: Automated Light Technologies, Inc., Tolland, Conn.

[21] Appl. No.: 993,257

[22] Filed: Dec. 18, 1992

[51] Int. Cl.⁵ .................................. H04B 10/00
[52] U.S. Cl. .......................... 359/171; 359/173; 379/379
[58] Field of Search ............... 359/167, 171, 173, 179, 359/142, 157; 379/379

[56] References Cited

U.S. PATENT DOCUMENTS

| | | | |
|---|---|---|---|
| 4,217,488 | 8/1980 | Hubbard | 359/167 |
| 4,596,051 | 6/1986 | Feldman | 359/179 |
| 4,817,204 | 3/1989 | Jannelli et al. | 379/379 |
| 4,844,573 | 7/1989 | Gillham et al. | 379/379 |
| 4,895,426 | 1/1990 | Pinson | 350/96.23 |
| 5,077,526 | 12/1991 | Vokey et al. | 324/541 |

*Primary Examiner*—Richard E. Chilcot, Jr.
*Assistant Examiner*—K. Negash
*Attorney, Agent, or Firm*—Pennie & Edmonds

[57] ABSTRACT

A system and a method for providing electrical power to an optical communication system, in particular a telephone system, between a local or central station and a remote station incorporates a conventional fiber optical cable having an electrical conductor or electrically conductive sheath connected to the local station and the remote station already used for transmitting optical signal. A power source is electrically connected to earth ground and to the electrical conductor or sheath at the local station. A power supply is provided at the remote station and electrically connected to the electrical conductor or sheath and to the earth ground thereat. The power supply receives electrical power from the power source located at the local station via the conductor or sheath and the earth ground, the earth ground serving as a return path. The power supply means can thus provide electrical power to an interface device or any other devices provided in the remote station. The power supply preferably includes a power storage devices such as one or more batteries.

19 Claims, 5 Drawing Sheets

OPTICAL COMMUNICATION SYSTEM AND METHOD ELECTRICAL POWER TRANSMISSION FOR THEREOF

FIELD OF THE INVENTION

This invention relates to an optical communication system and method. More specifically, it relates to a system using an optical fiber having a conducting sheath to deliver both electrical power and communication signals.

BACKGROUND OF THE INVENTION

Optical fibers are used to provide large bandwidth two-way communication between sender and receiver units. In a typical optical communication system, a telephone line interface unit receives electrical communication signals from the sender unit and converts them to optical signals. A second telephone line interface unit receives the optical signals and converts them back into electrical signals for processing by the receiver unit.

The electrical communication signals comprise supervisory signals and analog audio signals which transmit the voice or voice band communications. The supervisory signals include an off-hook signal, indicating that the phone is in use; a ring signal, which causes the bell to sound; and a dial pulse signal, which provides a string of pulses representing the dialed digits of the telephone number. The supervisory signals are low amperage and typically 48 volts or less. The audio signals are an electric analog signal representing the speech energy generated by the use of the telephone. Alternatively, the audio signal may be voice band data communication as generated by a modem unit. These communications are typically in the low frequency range of 300-3000 Hz and have a maximum amplitude of about 1 volt.

In most applications of fiber optic cables in communications, it is necessary to supply operating power to the optical-to-electrical signal interface equipment at the termination end, as well as to the customers' phones themselves. Presently, the operating power is provided by the optical energy itself, local AC power substations, batteries, or combinations of these. The primary disadvantage of such systems is that they are costly to install and maintain because they require external connections and are not self-contained.

Because most telephone systems are required to operate even in the event of local utility power outages, they generally employ some means for delivering standby power to the customer telephones. In conventional copper cable telephone systems, the source of standby power has been battery power at the central office, the batteries being charged by AC power sources or emergency generators. Such a conventional system is illustrated in FIG. 1. Communication signals and electrical power are delivered from a Local Telephone Equipment Office (LO) to a remote cable vault and thereafter to individual telephone units. The power for operating the telephone units accompanies the voice signal over standard multi-pair copper telephone cables. To prevent disruptions in communications, the cables are supplied with power by both a main and a standby power source. Typically, the main power source is provided directly by the local power utility service. Standby service may be provided by one or more generators or by storage batteries.

The telephone portions of "fiber to the home" or "fiber to the curb" systems are also required to operate during interruptions in utility service. A typical "fiber to the curb" system is illustrated in FIG. 2. In a "fiber to the curb" system, fiber optic cables convey the optical communication and supervisory signals from a Local Telephone Equipment Office (LO) to the remote cable vault and thereafter to a group of individual telephone units. The optical communication signals carried by fiber optic cables are converted into electric audio and supervisory signals by a telephone interface unit located in a remote equipment vault. Power to operate the telephone and telephone interface units is supplied, without a standby source, to the remote equipment vault by the local power utility.

SUMMARY OF THE INVENTION

An electrical power transmission system according to the present invention for providing electrical power to an optical signal communication system, in particular a telephone system, between a local or central station and a remote station incorporates a conventional fiber optical cable having an electrical conductor or electrically conductive sheath connected to the local station and the remote station already used for transmitting optical signal. Preferably, the distance between the central or local station and the remote station is less than 10 kilometers. A power source is electrically connected to earth ground and to the electrical conductor or sheath at the local station. A power supply means is provided at the remote station and electrically connected to the electrical conductor or sheath and to the earth ground thereat. The power supply means receives electrical power from the power source located at the local station via the conductor or sheath and the earth ground, the earth ground serving as a return path. The power supply means can thus provide electrical power to an interface device or any other devices provided in the remote station.

The power supply means includes a power storage means such as one or more batteries, the power storage means preferably having a charge rate of between 0.1 and 1.0 amperes at 48 volts nominal and a storage capacity of between 1 and 100 ampere-hours. The power supply means further can include a converter interconnecting the cable and the power storage means for converting an input voltage delivered by the electrical conductor to a predetermined output voltage. Preferably, the input voltage is between $-1$ and $-100$ volts DC and the predetermined output voltage is between $-12$ and $-48$ volts DC. The power supply means further includes means for preventing overcharging of the power storage means. The converting means may comprise a DC—DC converter which also prevents overcharge of the power storage means.

A method according to the present invention for providing electrical power between the local or central station and the remote station in an optical signal communication system, in particular a telephone system, comprises the steps of establishing or providing a fiber optic communication between the local and the remote stations with a cable having an electrical conductor or electrically conductive sheath. At the local station, a power source is provided and electrical connection of the power source is made to the electrical conductor or electrically conductive sheath and to earth ground. At the remote station, a power supply means is provided and electrical connection of the power supply means is made to the electrical conductor or electrically conductive sheath and to earth ground. The power supply means receives electrical power from the power source located at the local station via the conductor or sheath and the earth ground, the earth ground serving as a return path. Again the power supply means preferably includes a power storage means such as one or more batteries, a DC—DC converter, and/or an overcharge protection device.

DESCRIPTION OF THE PREFERRED EMBODIMENT

Figure 1:
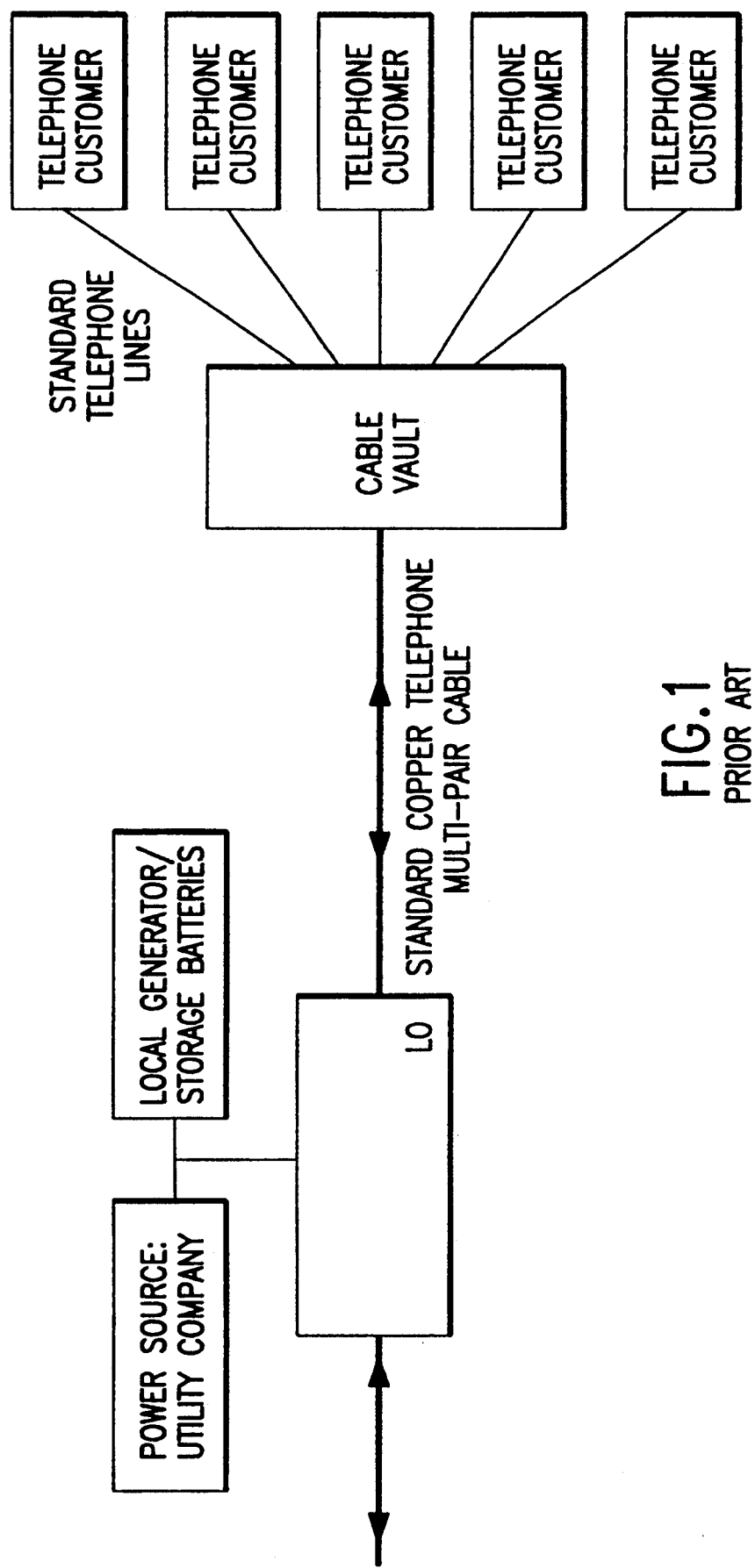
FIG. 1 is a block diagram of a conventional telephone communication system using standard copper telephone cables and including local main and emergency standby power sources.
Figure 2:
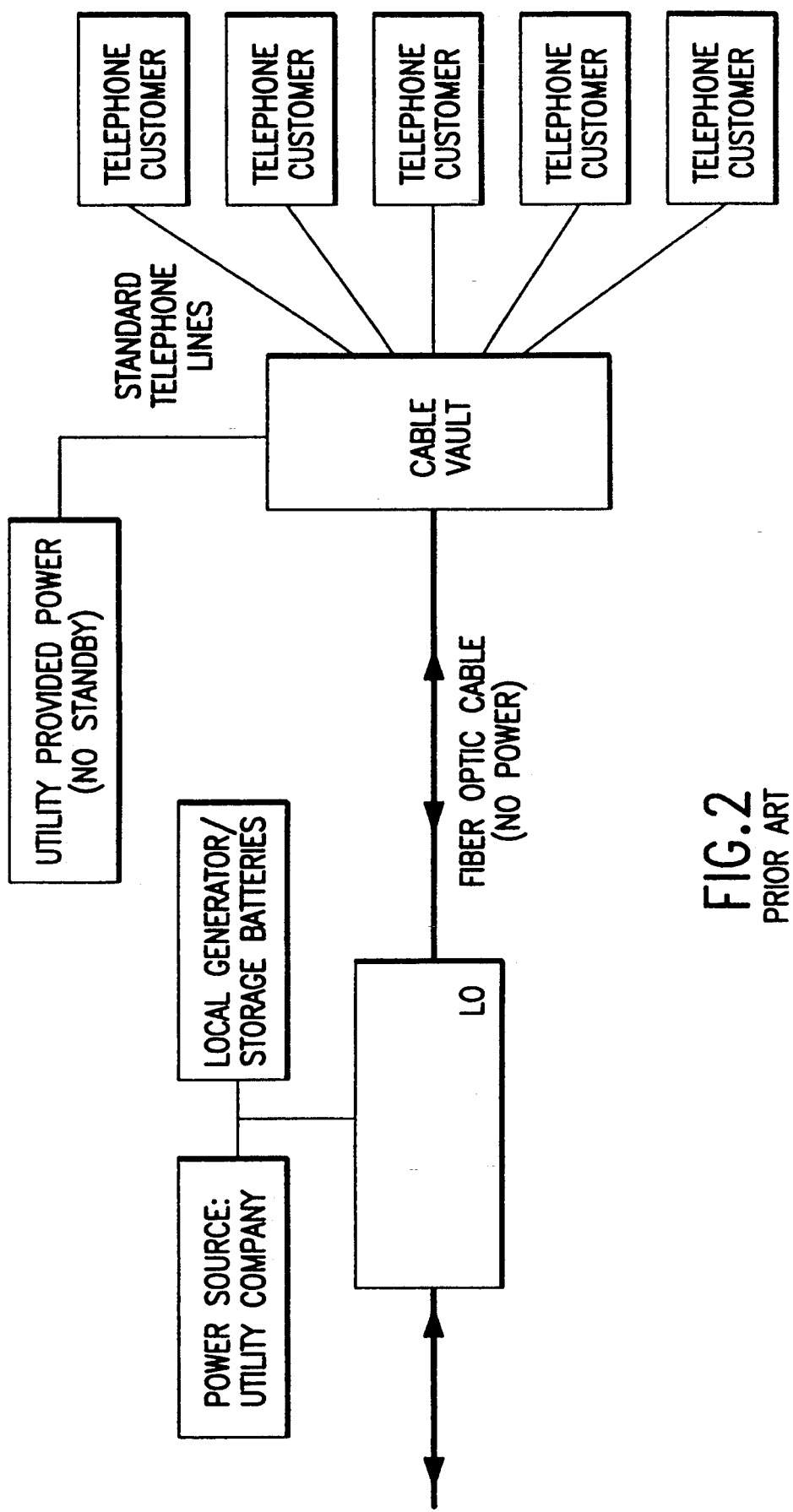
FIG. 2 is a block diagram of another conventional telephone communication system using fiber optic cables and a remote power source.
Figure 3:
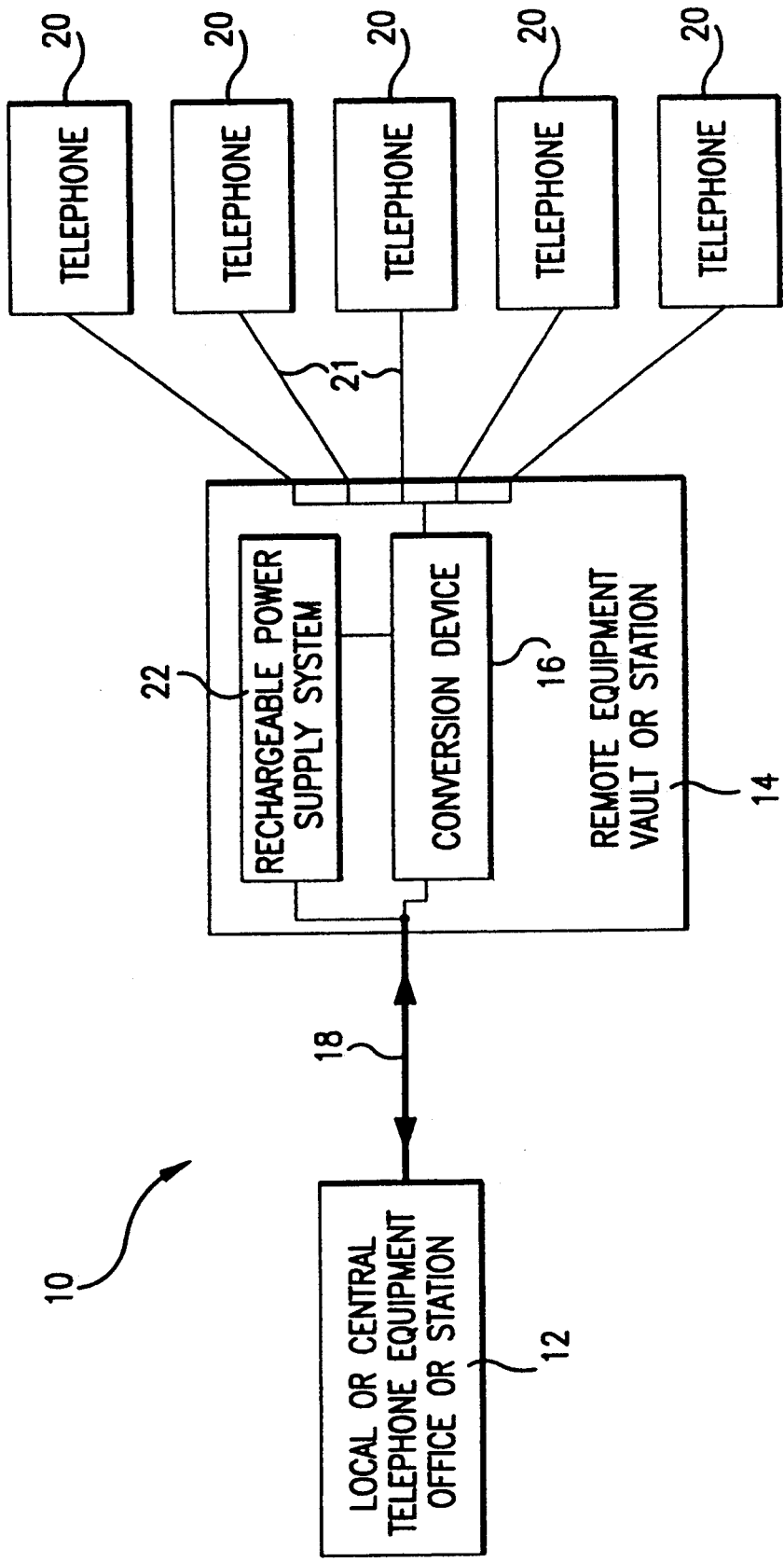
FIG. 3 is a block diagram of a fiber optic telephone communication system in accordance with the present invention.

With reference now to FIG. 3, a fiber to the curb telephone communication system generally designated by the numeral 10 includes a local or central telephone equipment office or station 12, a remote equipment vault or station 14 housing an optical to electrical signal conversion or interface device 16, a conventional armored fiber optic cable 18 for carrying optical communication signals between the local telephone office 12 and the signal conversion device 16, and one or more telephones 20 connected to signal conversion device 16. To provide operating power to the signal conversion device 16 and the telephones 20, the present invention uses a rechargeable power supply system 22 located within the equipment vault 14.

Figure 4:
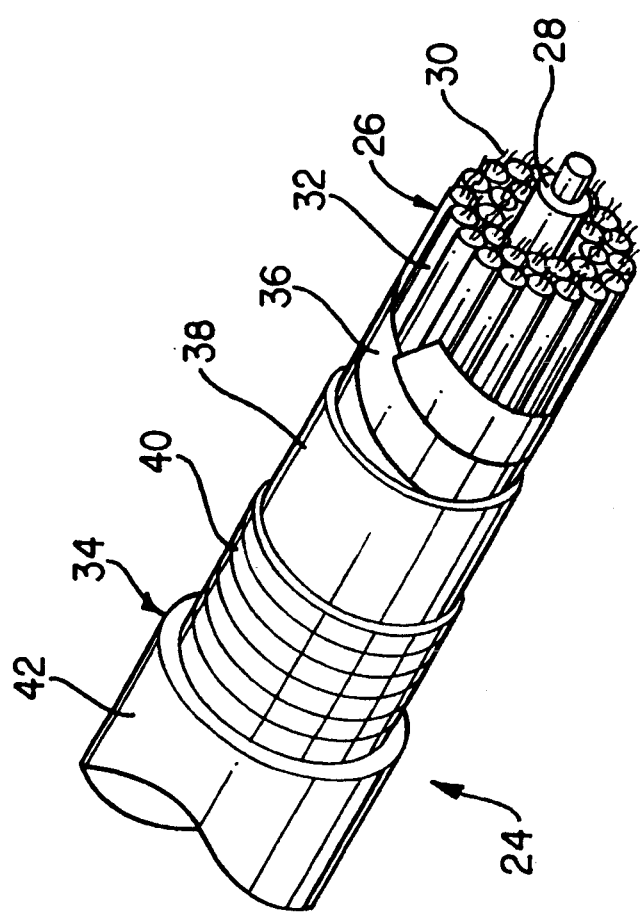
FIG. 4 is a partial perspective view of a conventional fiber optic cable which may be used with the present invention.

FIG. 4 illustrates a conventional fiber optic cable 24, as described in U.S. Pat. No. 5,077,526. The cable has a core 26 containing a central strength member 28 surrounded by optical fibers 30 contained in buffer tubes 32. The sheath 34 includes a layer of binder tape 36 covered by an inner polyethylene jacket 38, a steel armor layer 40 and an outer polyethylene outer jacket 42.

Figure 5:
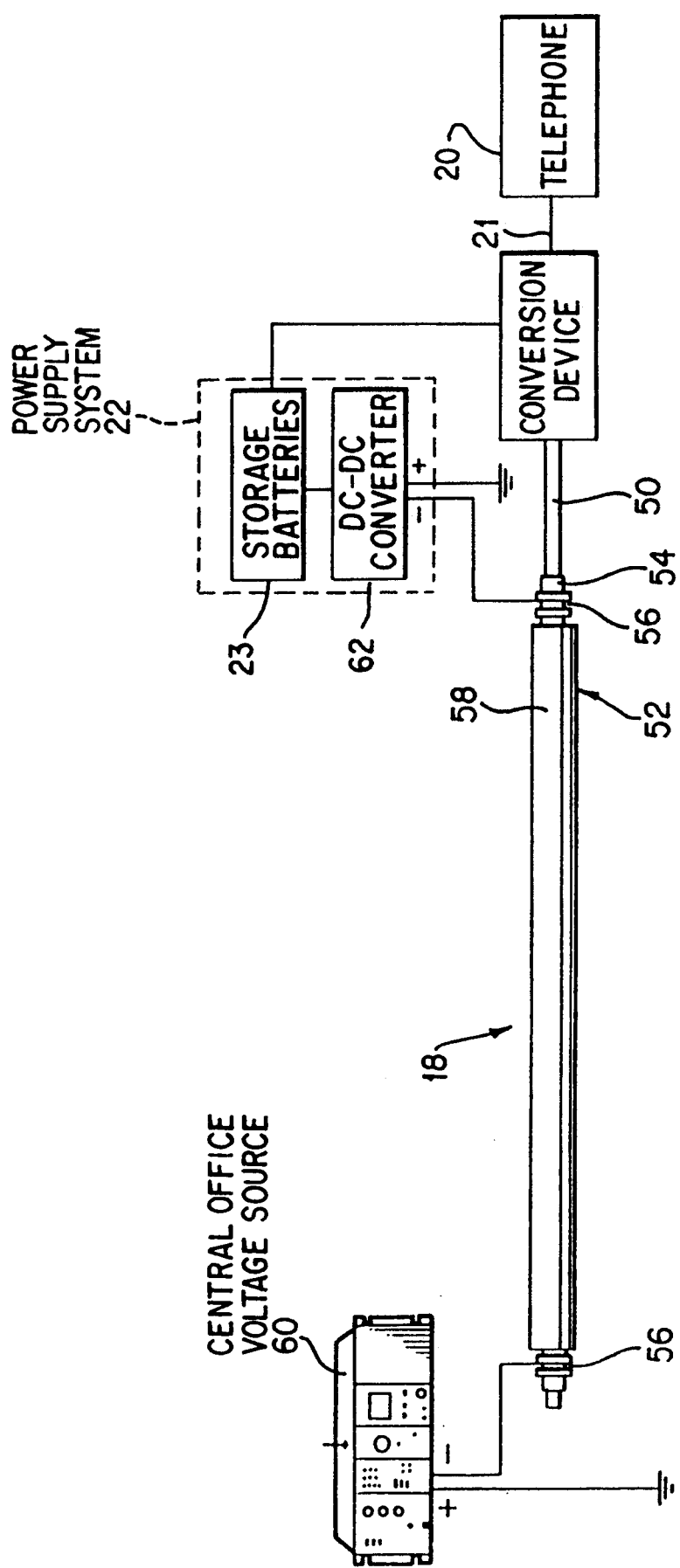
FIG. 5 is a schematic illustration of a system according to the present invention using a steel armor and an earth return to provide operating power to a remote telecommunications equipment.

In "fiber to the curb" applications, typical cable runs are generally 5 kilometers or less. The armor layer of a conventional armored fiber optic cable such as that shown in FIG. 4 generally has an electrical resistance of between 10 and 20 ohms per km of length in the armor. Accordingly, the overall resistance of the cable 18 in the installation shown in FIG. 3 will be between 50 and 100 ohms. The present invention advantageously uses the conductive properties of the armor layer of the cable 18 to charge the power supply system 22 and thereby provide a self-contained means of providing operating power to the remote equipment vault 14. To achieve this electric power is supplied to the cable armor via a main utility source or by stand-by means such as an emergency generator or battery located in the local office 12. An earth ground return path as shown in FIG. 5. The use of a ground return path reduces the cost by requiring only a single conductor which is often already present in the cable for mechanical strength.

As shown in FIG. 5, the cable 18, like the cable 24 shown in FIG. 4, is shown having a core 50 and a sheath 52, with the sheath including an inner jacket 54, a metal armor layer 56 and an outer polyethylene jacket 58. The armor layer 56 is connected to central office voltage source 60 and the power supply system 22 at opposite ends of the cable 18. The positive side of the voltage source 60 and the positive terminal of power supply system 22 are grounded to provide a common ground return path. The DC voltage applied to the armor layer 56 maintains the armor at a negative potential with respect to ground, so that the cable is cathodically protected.

A pre-determined DC voltage with respect to the ground is applied to the cable armor by the central office voltage source. This provides a DC line current through the armor and the power supply system 22 with an earth ground return path. As will be apparent to those of ordinary skill in the art, the amount of power available at the end of the cable 18 is limited by the resistance of the cable, the quality (resistance) of the ground connection which forms the return path at each end of the system and the amount and magnitude of any cable faults. For example, using a −48 V DC source, a common low-resistance cable, and a total return path (ground) resistance of 10 ohms, it is possible to deliver a potential power level of over 10 watts to an equipment vault located 5 km from the central office. Using other cable configurations with somewhat higher resistances per km would still yield approximately 2.5 watts.

Although the power delivery levels discussed above are not large, the power supply system 22 advantageously can employ one or more storage batteries 23 to meet peak power demand. The battery size will, of course, depend upon the actual power consumption requirements of the line equipment and the number of telephones served by a given installation. The battery capacity selected should, however, be sufficient to operate the system over a 24 hour period. For most installations, a battery storage capacity of between one Ampere-hour and 100 ampere-hours will be sufficient. Depending on the installation, however, higher or lower capacities may also be utilized.

The discharge rate of battery 23 will also depend on the requirements of the installation. It is anticipated that ordinary telephone service will require peak discharge rates of 10 times or more of the charge rate. Since telephone service has a fairly short operation duty cycle, it is expected that a charge rate of between 0.1 to 1.0 Amperes (at 48 V DC nominal) will be sufficient. Preferably, the battery is charged continuously, thereby yielding between 100 and 1000 watthours per day.

It should be apparent that the output voltage from the cable will depend upon the input voltage, the length of the cable, and the load. Preferably, therefore, a DC—DC converter 62 is provided to regulate the voltage to a stable, predetermined level, convert the input voltage to the desired output voltage, and regulate the recharge operation to prevent overcharging. Although 48 volts is the most common operating voltage in the telecommunications industry, it will be apparent that the system of the present invention may operate from other voltages, such as 12 or 24 volts. Accordingly, DC—DC converter 62 and battery system 22 can be designed to operate at the desired voltage.

The efficiency of converter 62 should be high in order to maximize the available power. Although it is preferred that the efficiency be between 80% and 90%, it is contemplated that in the interest of economy and commercial availability, lower efficiency converters may also be used.

The present invention enables a fiber optic communication system which is operable even during power outages at the remote station. Moreover, the present invention provides a system which requires no external power connections at the remote station, thus making the system economical to install and maintain. Moreover, the present invention provides a system which utilizes the reinforcing metallic sheath member already utilized by many conventional fiber optic cables as the means of delivering power to operate the interface equipment, thus making it possible to convert or retrofit existing installations with minimal labor and expense.

What is claimed is:

1. In an optical communication system for providing optical communication between a local station and a remote station, using at least one cable having an elongated fiber core and an electrical conductor or electrically conducting sheath, the improvement for providing electrical power to said remote station from said local station comprising:
    a power source provided at said local station and connected to said conductor or sheath and to earth ground; and
    a power supply means located at said remote station, said power supply means connected to said conductor or sheath and to the earth ground thereat, wherein said power supply means receives electrical power from said power source located at said local station via said conductor or sheath, the earth ground serving as a return path, and wherein said power supply means provides power to an interface device provided at said remote station.

2. The improvement according to claim 2, wherein said power supply means comprises at least one battery.

3. The improvement according to claim 2, wherein said at least one battery provides 48 volts and a charge rate of between 0.1 and 1.0 amperes at said 48 volts.

4. The improvement according to claim 2, wherein said at least one battery has a storage capacity of between 1 and 100 ampere-hours.

5. The improvement according to claim 2, wherein said power supply means further includes a converter connected to said at least one battery for converting an input voltage delivered to said battery by said electrically conductive layer to a predetermined output voltage for supplying to said interface device provided at said remote station.

6. The improvement according to claim 5, wherein said predetermined output voltage is less than 100 volts.

7. The improvement according to claim 5, wherein said predetermined output voltage is 48 volts.

8. The improvement according to claim 5, wherein said power supply means further includes means for preventing overcharging of said at least one battery.

9. The improvement according to claim 2, wherein said power supply means comprises a DC—DC converter connected to said at least one battery.

10. An electrical power transmission system for providing electrical power to an optical communication system between a local station and a remote station comprising:
    a fiber optical cable having an electrical conductor or electrically conductive sheath connected to said local station and said remote station for transmitting optical signal;
    a power source located at said local station and electrically connected to earth ground at said local station and to said electrical conductor or sheath;
    a power supply means located at said remote station and electrically connected to said electrical conductor or sheath and to the earth ground at said remote station,
        wherein said power supply means receives electrical power from said power source located at said local station via said conductor or sheath and the earth ground, the earth ground serving as a return path, and wherein said power supply means provides electrical power for an interface device provided at said remote station.

11. The system of claim 10, wherein the distance between said local station and said remote station is less than 10 kilometers.

12. The system of claim 10, wherein said power supply means includes means connected to said electrical conductor for changing an input voltage supplied by said power source to a predetermined output voltage.

13. The system of claim 12, wherein said power supply means further includes power storage means, said power storage means receiving dc power at said predetermined output voltage from said input voltage changing means.

14. A method for providing electrical power to a remote station from a local station in an optical communication system comprising the steps of:
    (a) establishing a fiber optic communication between said local and remote stations with an optical cable having an electrical conductor or electrically conductive sheath;
    (b) providing a power source at said local station and electrically connecting said power source to said electrical conductor or electrically conductive sheath and to earth ground at said local station;
    (c) providing a power supply means at said remote station and electrically connecting said power supply means to said electrical conductor or electrically conductive sheath and to earth ground at said remote station,
        wherein said power supply means receives electrical power from said power source located at said local station via said conductor or sheath and the earth ground, the earth ground serving as a return path.

15. The method of claim 14, wherein said power supply means comprises a DC—DC voltage converter and a power storage means.

16. The method of claim 14, wherein said power supply means comprises at least one battery.

17. The method of claim 16, wherein said at least one battery provides 48 volts and a charge rate of between 0.1 and 1.0 amperes at said 48 volts.

18. The method of claim 16, wherein said at least one battery has a storage capacity of between 1 and 100 ampere-hours.

19. The method of claim 16, wherein said power supply means further includes a converter connected to said at least one battery for converting an input voltage delivered to said battery to a predetermined output voltage.

* * * * *

UNITED STATES PATENT AND TRADEMARK OFFICE
CERTIFICATE OF CORRECTION

PATENT NO. : 5,369,518

DATED : November 29, 1994

INVENTOR(S) : Mohd Aslami
Ronald L. Lavallee

It is certified that error appears in the above-identified patent and that said Letters Patent is hereby corrected as shown below:

Column 5, line 42, Claim 2, "claim 2" should be --claim 1--.

Signed and Sealed this

Seventh Day of March, 1995

*Attest:*

BRUCE LEHMAN

*Attesting Officer*   *Commissioner of Patents and Trademarks*